US010383464B2

(12) United States Patent
Morin et al.

(10) Patent No.: US 10,383,464 B2
(45) Date of Patent: Aug. 20, 2019

(54) FLOWER POTS SUPPORT MODULAR SYSTEM

(71) Applicant: LES INDUSTRIES RONDI INC., Montreal, Quebec (CA)

(72) Inventors: Francois Morin, Montreal (CA); Marie Cvetkovich, St-Basile-Legrand (CA); Gennaro Rosato, Laval (CA); Mario Primeau, Montreal (CA)

(73) Assignee: LES INDUSTRIES RONDI INC., Montreal, Quebec (CA)

( * ) Notice: Subject to any disclaimer, the term of this patent is extended or adjusted under 35 U.S.C. 154(b) by 0 days.

(21) Appl. No.: 16/183,137

(22) Filed: Nov. 7, 2018

(65) Prior Publication Data

US 2019/0150641 A1   May 23, 2019

Related U.S. Application Data

(60) Provisional application No. 62/587,568, filed on Nov. 17, 2017.

(51) Int. Cl.
| *A47G 7/04* | (2006.01) |
| *A01G 9/02* | (2018.01) |
| *A47F 7/00* | (2006.01) |

(52) U.S. Cl.
CPC .............. *A47G 7/04* (2013.01); *A01G 9/023* (2013.01); *A47F 7/0078* (2013.01)

(58) Field of Classification Search
CPC ........ A47G 7/04; A47G 7/0078; A01G 9/023; A01G 9/024; A01G 9/025; A01G 9/027; A01G 9/0297

USPC ......................................................... 211/85.23
See application file for complete search history.

(56) References Cited

U.S. PATENT DOCUMENTS

| 3,099,355 | A | * | 7/1963 | Kane | ..................... A01G 9/028 211/75 |
| D262,274 | S | * | 12/1981 | Lahr | ................................. 47/82 |
| 4,793,097 | A | * | 12/1988 | Whitcomb | ........... A01G 9/0297 47/86 |
| 4,803,806 | A | * | 2/1989 | Ito | ............................ A01G 9/00 248/27.8 |
| 5,265,376 | A | * | 11/1993 | Less | ....................... A01G 9/022 47/83 |
| 6,116,434 | A | * | 9/2000 | Park | ....................... A47B 81/00 211/71.01 |

(Continued)

FOREIGN PATENT DOCUMENTS

| DE | 1209865 B | * | 1/1966 | ........... A47F 7/0078 |
| DE | 102016013728 A1 | * | 5/2018 | ............. A01G 9/023 |

(Continued)

*Primary Examiner* — Stanton L Krycinski
(74) *Attorney, Agent, or Firm* — Shumaker, Loop & Kendrick, LLP; James D. Miller

(57) ABSTRACT

A flower pot support assembly includes a rectangular panel defining a few windows. The support is engaged and retained into a corresponding panel window via lateral flange grooves. An arcuate seat is made integral to the panel window periphery and abuttingly cooperates with a corresponding flower pot support and associated window edge sloping ramps for flower pot support sliding and tilting engagement within the panel window, all in such a way as to releasably lock the flower pot support in nesting condition inside the panel window with the support member mouth facing upwardly.

8 Claims, 13 Drawing Sheets

(56) References Cited

U.S. PATENT DOCUMENTS

| | | | | |
|---|---|---|---|---|
| 7,020,997 | B1* | 4/2006 | Thomas | A01G 9/028 47/39 |
| 8,250,804 | B2* | 8/2012 | Chang | A01G 9/025 47/39 |
| 8,776,433 | B2* | 7/2014 | Huang | A01G 9/022 47/82 |
| 9,004,298 | B2* | 4/2015 | Sichello | A01G 9/025 211/126.2 |
| 9,271,452 | B2* | 3/2016 | Sung | A01G 9/025 |
| 9,468,156 | B2* | 10/2016 | Sichello | A01G 9/025 |
| 9,635,816 | B2* | 5/2017 | Garcia Arizpe | A01G 9/022 |
| 9,839,183 | B2* | 12/2017 | Chang | A01G 27/005 |
| 9,968,039 | B2* | 5/2018 | Graber | A01G 31/06 |
| 10,051,795 | B2* | 8/2018 | Wu | A01G 9/023 |
| 10,123,494 | B2* | 11/2018 | Janssen | A01G 9/025 |
| 2002/0157308 | A1* | 10/2002 | Hanis | A47F 7/0078 47/41.01 |
| 2004/0115595 | A1* | 6/2004 | Dancer | A47F 7/0078 434/93 |
| 2006/0043038 | A1* | 3/2006 | Wetzel | A47F 7/0078 211/88.03 |
| 2010/0146855 | A1* | 6/2010 | Ma | A01G 9/025 47/82 |
| 2011/0113685 | A1* | 5/2011 | Chang | A01G 9/025 47/39 |
| 2011/0219689 | A1* | 9/2011 | Hodson-Walker | E02D 29/0216 47/66.6 |
| 2014/0298723 | A1* | 10/2014 | Chen | A01G 9/025 47/79 |
| 2015/0096229 | A1* | 4/2015 | Chang | A01G 27/005 47/82 |
| 2018/0263193 | A1* | 9/2018 | Diller | A01G 9/027 |

FOREIGN PATENT DOCUMENTS

| | | | |
|---|---|---|---|
| FR | 2711399 A1 | 4/1995 | |
| FR | 2882040 A1 * | 8/2006 | ............. A01G 9/021 |
| FR | 2884386 A1 * | 10/2006 | ............... A47F 5/12 |
| FR | 2926711 A1 * | 7/2009 | ........... A01G 9/0297 |
| GB | 2071976 A * | 9/1981 | ............... A47G 7/04 |
| GB | 2190359 A | 11/1987 | |
| GB | 2490001 A | 10/2012 | |
| WO | 2016191596 A1 | 12/2016 | |

* cited by examiner

FLOWER POTS SUPPORT MODULAR SYSTEM

CROSS-REFERENCE TO RELATED PATENT APPLICATION

This utility patent application claims convention priority to U.S. provisional patent application Ser. No. 62/587,568 filed Nov. 17, 2017, the entire disclosure of which is incorporated herein by reference.

FIELD OF THE INVENTION

This invention relates to a modular system made of one or more panels for supporting flower pots over ground. The modular system is characterized in that the panel(s) may have various orientations and relative spatial arrangements. At least one of the panels may be secured to an upright wall member spacedly over ground. The flower pots are easily removed from the panels by sequentially sliding and then tilting movements.

The prior art discloses various flower pot supports, with many drawbacks, including:
 each individual flower pot support needs to be secured to a support wall independently of the other flower pots;
 some flower pot support arrangements are simply superimposed over ground.

The present invention enables to adjust the overall dimensions of the final flower pot support peripheral frame. The flower pots can easily be installed on or removed from the flower pot support member of the invention.

SUMMARY OF THE INVENTION

The present invention relates to a flower pot support assembly comprising at least one rigid panel, each said panel defining at least one window, and at least one flower pot support member each sized and shaped for through retaining engagement inside a corresponding one said window, each said support member defining a first wall forming a top arcuate edge, two lateral side wall edges and an arcuate flooring bottom edge portion, a second wall having two opposite side edge portions, a bottom end portion and a top free edge portion, and a pair of cross-sectionally arcuate radially inwardly projecting rail members integrally interconnecting said second wall side edge portions with said first wall side edge portions, wherein an open enclosure pocket is formed therebetween defining a top flower pot engaging mouth, each said rail member defining a trough opening in a direction opposite said top mouth transversely thereof and releasably engaged by complementary two opposite edge members of said window, and seat means integral to said panel adjacent an arcuate lower portion of each said window and abuttingly cooperating with a corresponding said support member second wall bottom edge portion and with said rail members under flower pot support sliding and tilting engagement, all in such a way as to releasable lock said support member in a nesting condition inside said panel window with said support member mouth facing upwardly.

In one embodiment, said second wall is generally planar and slightly arcuate, forming a convex face oriented toward said support member pocket.

In one embodiment, each said panel is quadrangular and defines two opposite side edge portions and said first wall is semi-hemispheric, and further including two additional juxtaposed said panels and complementary first and second key means releasably interlocking said panels side edge portions in successive pairs of said panels wherein a planar triple panels flower portion support assembly is obtained. Said first key means could possibly consist of a number of releasable cross-sectionally U-shaped connectors each having two opposite resilient side legs with each said leg forming on an interior face thereof a retaining barb, each said connector sized and shaped for overlapping transverse engagement against a successive pair of juxtaposed said panels side edge portions, and said second key means consists of wedge means integral to said panels side edge portions and sized and shaped for releasable interlock with selected said U-shape connectors.

There may be added a water draining grate, mounted at the bottom of said support pocket above said first wall flooring portion.

In one embodiment, mounting means are provided integral to one of said at least one panel, for releasable anchoring of the latter to a structural brace above ground whereby said flower pot support assembly hangs freely spacedly above ground.

In one embodiment, there is further included sloping ramp means integral to each said panel at the peripheral edge of each said window and cooperating with said seat means and said support member two lateral side wall edges during sliding and tilting engagement of the support member retainingly through said panel window.

The invention also relates to a method of releasable engagement of a flower pot support inside the window of an overhanging support panel, said panel of the type having at least one window, said flower pot support member sized and shaped for through retaining engagement inside a corresponding one said window, each said support member defining a first wall forming a top arcuate edge, two lateral side wall edges and an arcuate flooring bottom edge portion, a second wall having two opposite side edge portions, a bottom end portion and a top free edge portion, and a pair of cross-sectionally arcuate radially inwardly projecting rail members integrally interconnecting said second wall side edge portions with said first wall side edge portions, wherein an open enclosure pocket is formed therebetween defining a top flower pot engaging mouth, each said rail member defining a trough opening in a direction opposite said top mouth transversely thereof releasably engaged by complementary two opposite edge members of said window, sliding ramp means and seat means both integral to said panel window; wherein said method comprises the following steps: engaging said support through said window; edgewisely slidingly engaging said support side edges into said panel rail members along said ramp means; hingedly tilting said support from a first orientation transverse to said window to a second orientation generally co-planar with said window; and upon reaching said second orientation, abutting said support against said panel seat means in cooperating fashion with a corresponding said support member second wall bottom edge portion and with said rail members under flower pot support sliding and tilting engagement, all in such a way as to releasable lock said support member inside said panel window with said support member mouth facing upwardly.

DETAILED DESCRIPTION OF THE EMBODIMENTS OF THE INVENTION

Figure 1:
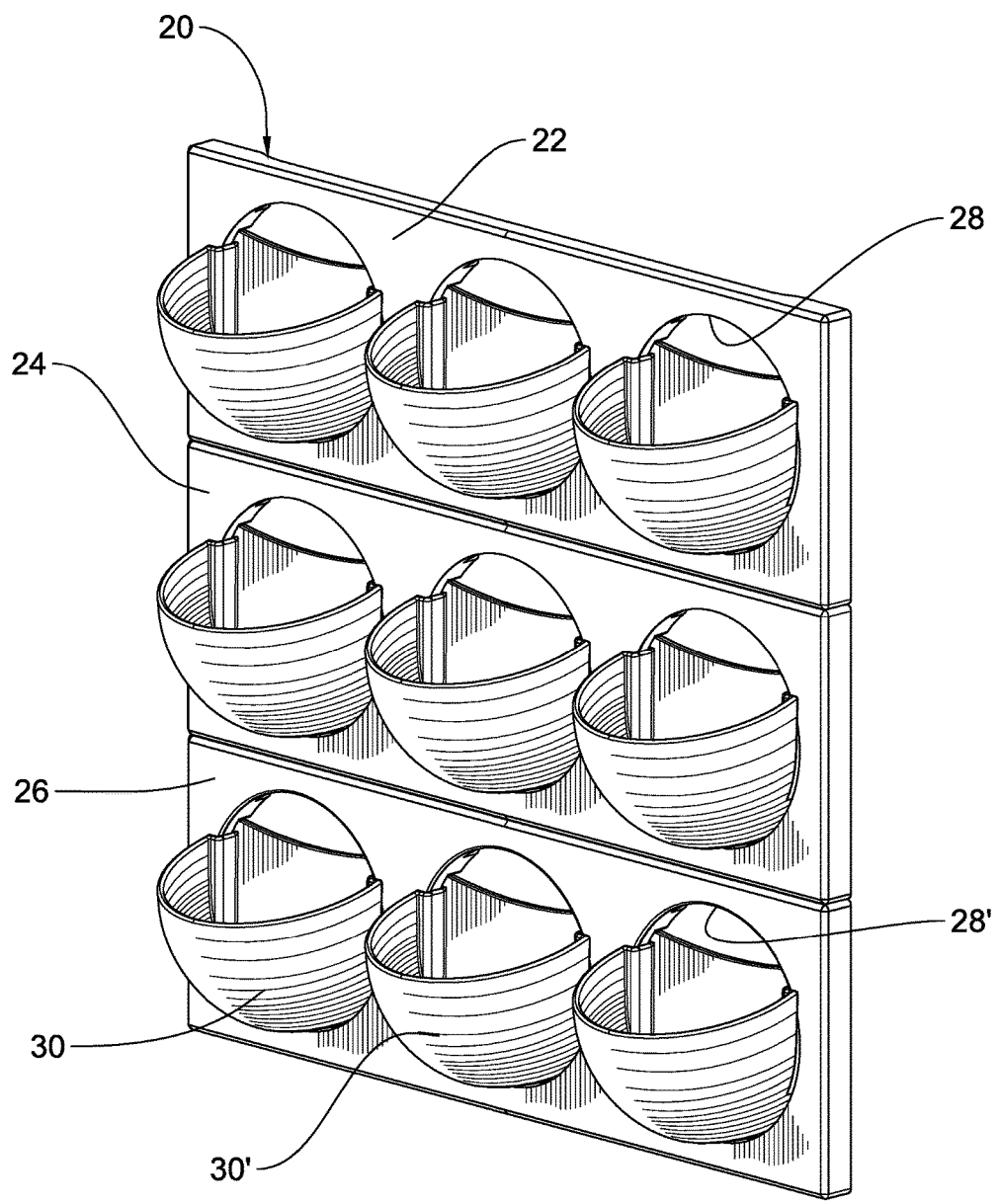
FIG. 1 is a front perspective view of a first embodiment of the invention, showing a generally square array of three juxtaposed rectangular panels extending horizontally and carrying nine flower pot support members for supporting flower pots.

In the embodiment of FIG. 1, a vertically interconnected three panels array 20 is formed, defining a top panel 22, intermediate panel 24 and bottom panel 26, all panels 22, 24, and 26 extending horizontally. Each panel 22, 24, 26 may be quadrangular, for example rectangular as illustrated and includes a number (e.g. three as shown) of circular windows 28, 28', . . . each for releasable interlocking engagement by a flower pot support member 30, 30', . . . sized and shaped accordingly.

Figure 2:
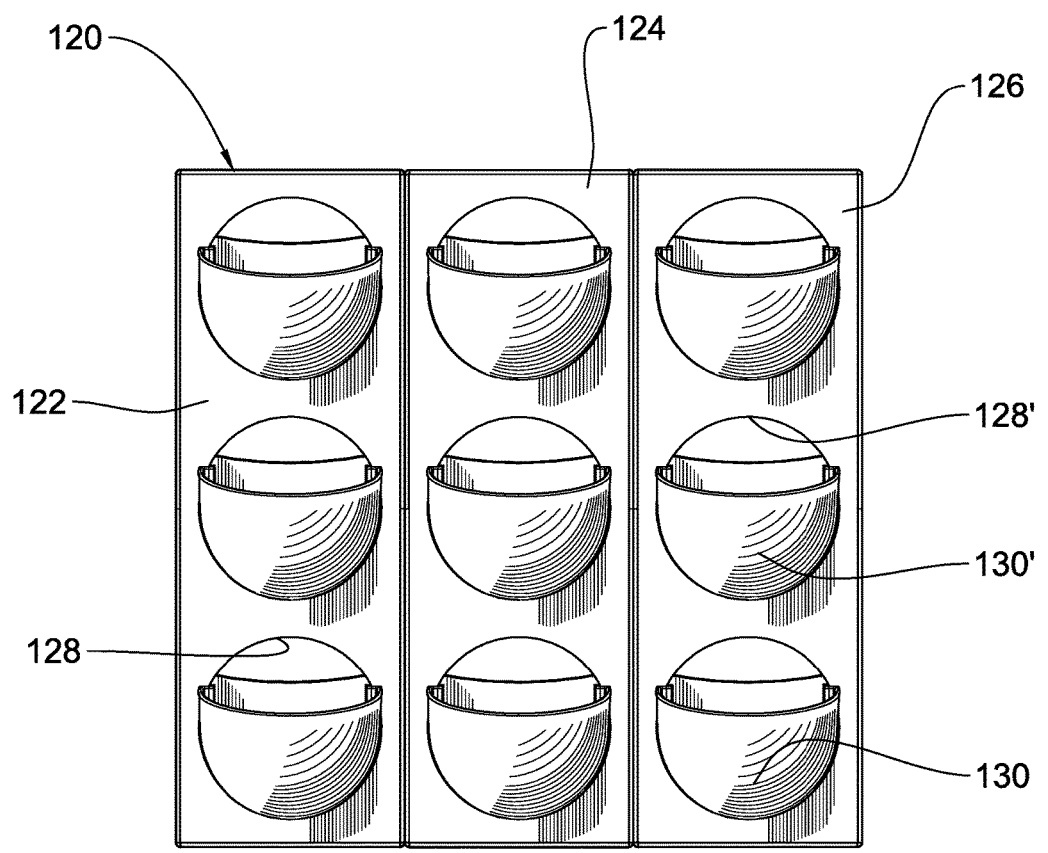
FIG. 2 is a front elevational view of a second embodiment of the invention, showing a generally square planar array of three interconnected upright rectangular panels each carrying a triplet of flower pot support members for supporting flower pots.

In the embodiment of FIG. 2, a horizontally interconnected three panels array 120 is formed, defining a left end panel 122, an intermediate panel 124 and a right end panel 126, all panels 122-126 extending vertically. Each panel 122-126 may be rectangular and may include a number (e.g. three as shown) of circular windows 128, 128', . . . each for releasable interlocking engagement by a flower pot support member 130, 130', . . . sized and shaped accordingly. Each window 128 may be e.g. circular or ovoidal.

Figure 3:
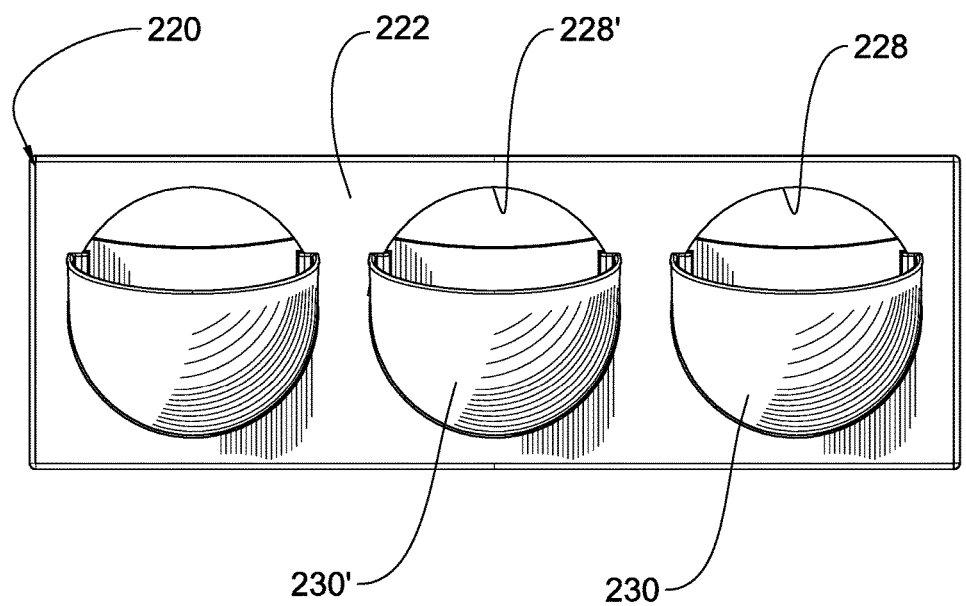
FIG. 3 is a front elevational view of a third embodiment of the invention, showing a single horizontally extending rectangular panel of three flower pot support members for supporting flower pots.

In the embodiment of FIG. 3, a single panel array 220 is formed, defining a single horizontally extending panel 222. Panel 222 includes a number (e.g. 3) of circular windows 228, 228', . . . each for releasable interlocking engagement by a flower pot support member 230, 230', . . . sized and shaped accordingly.

Figure 4:
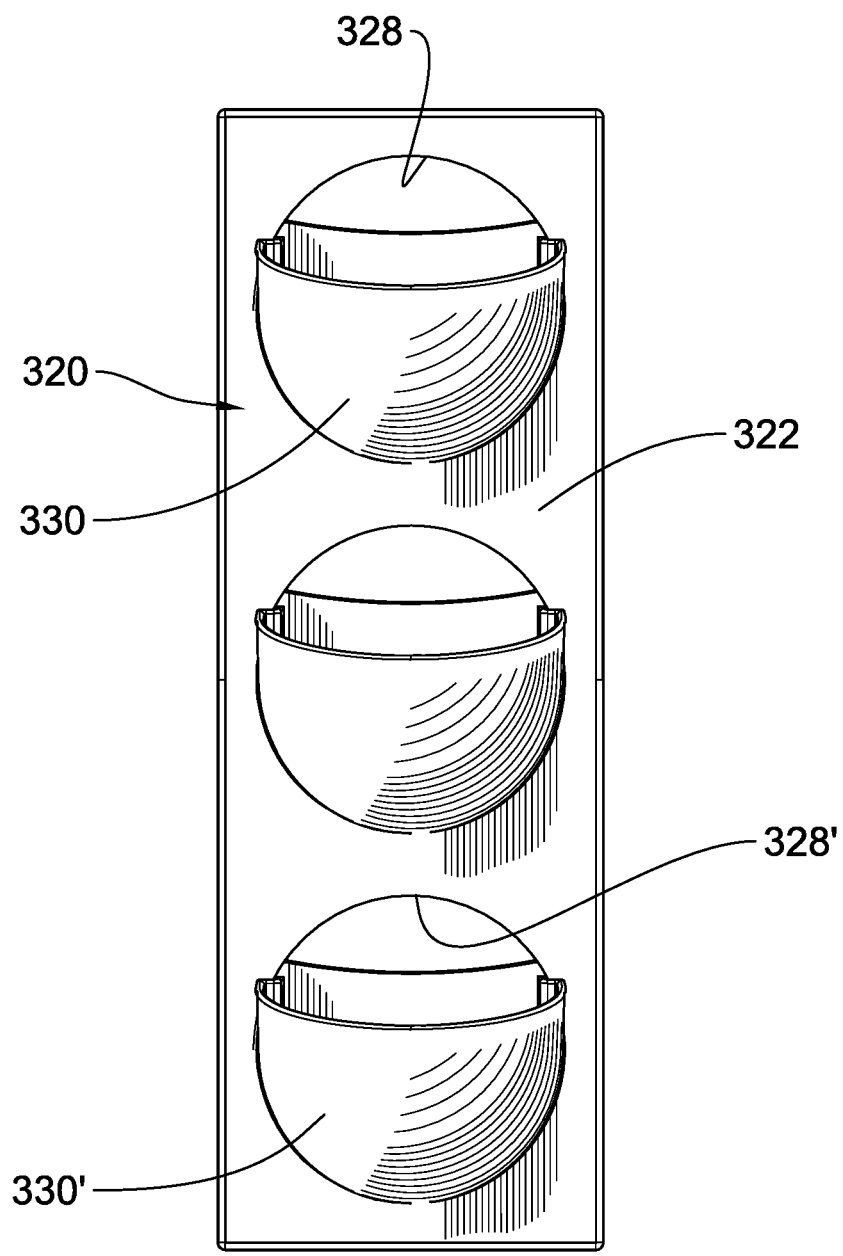
FIG. 4 is a front elevational view of a fourth embodiment of the invention, showing a vertically extending single rectangular panel of three flower pot support members for supporting flower pots.
Figure 4A:
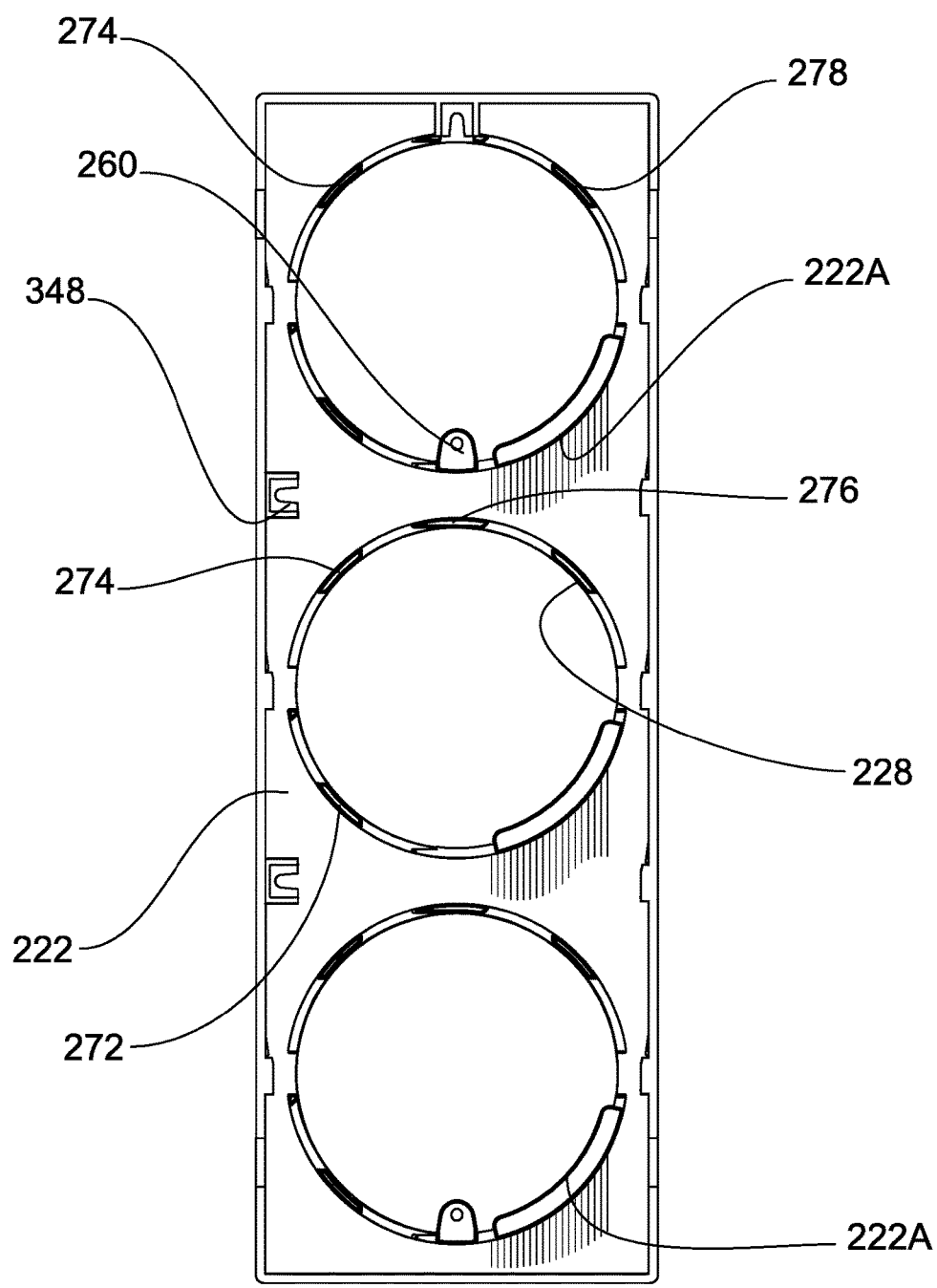
FIG. 4A is a rear elevational view of the fourth embodiment of panel of FIG. 4, but at a slightly enlarged scale and with the three flower pot support members removed for clarity of the view.

In the embodiment of FIGS. 4 and 4A, a single panel array 320 is formed, defining a single vertically extending panel 322. Panel 322 includes a number (e.g. 3) of circular windows 328, 328', . . . each for releasable interlocking engagement by a flower pot support member 330, 330', . . . sized and shaped accordingly.

Figure 5:
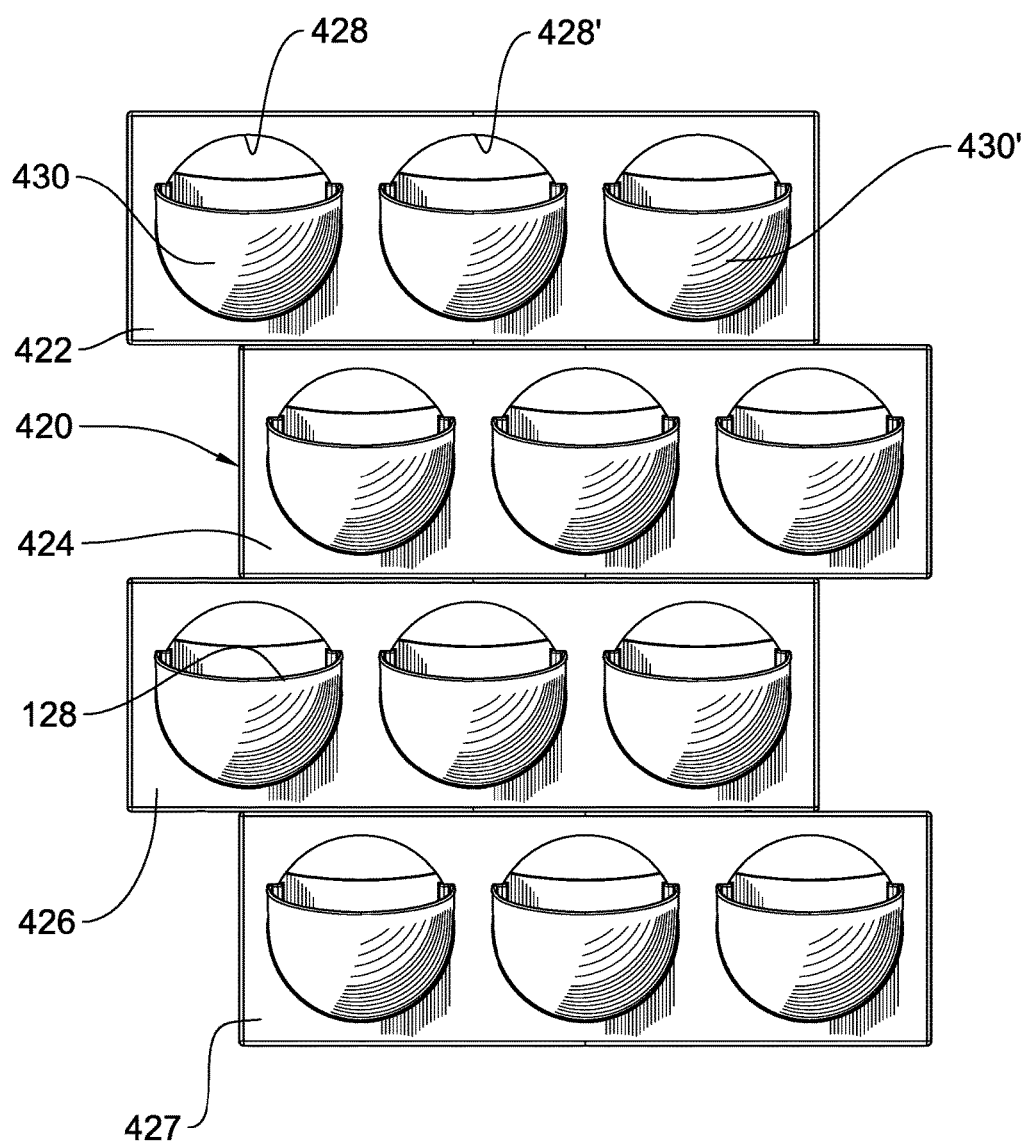
FIG. 5 is a front elevational view of a fifth embodiment of the invention, showing an array of four laterally horizontally staggered, vertically superimposed rectangular panels each extending horizontally and carrying a triplet of flower pots support members for supporting flower pots.

In the embodiment of FIG. 5, an interconnected four panels array 420 is formed, defining four vertically superimposed panels 422, 424, 426 and 427, all panels 422-427 extending horizontally and being laterally staggered. Each panel 422-427 includes a number (e.g. 3) of circular windows 428, 428', . . . each for releasable interlocking engagement by a flower pot support member 430, 430', . . . sized and shaped accordingly.

Figure 6:
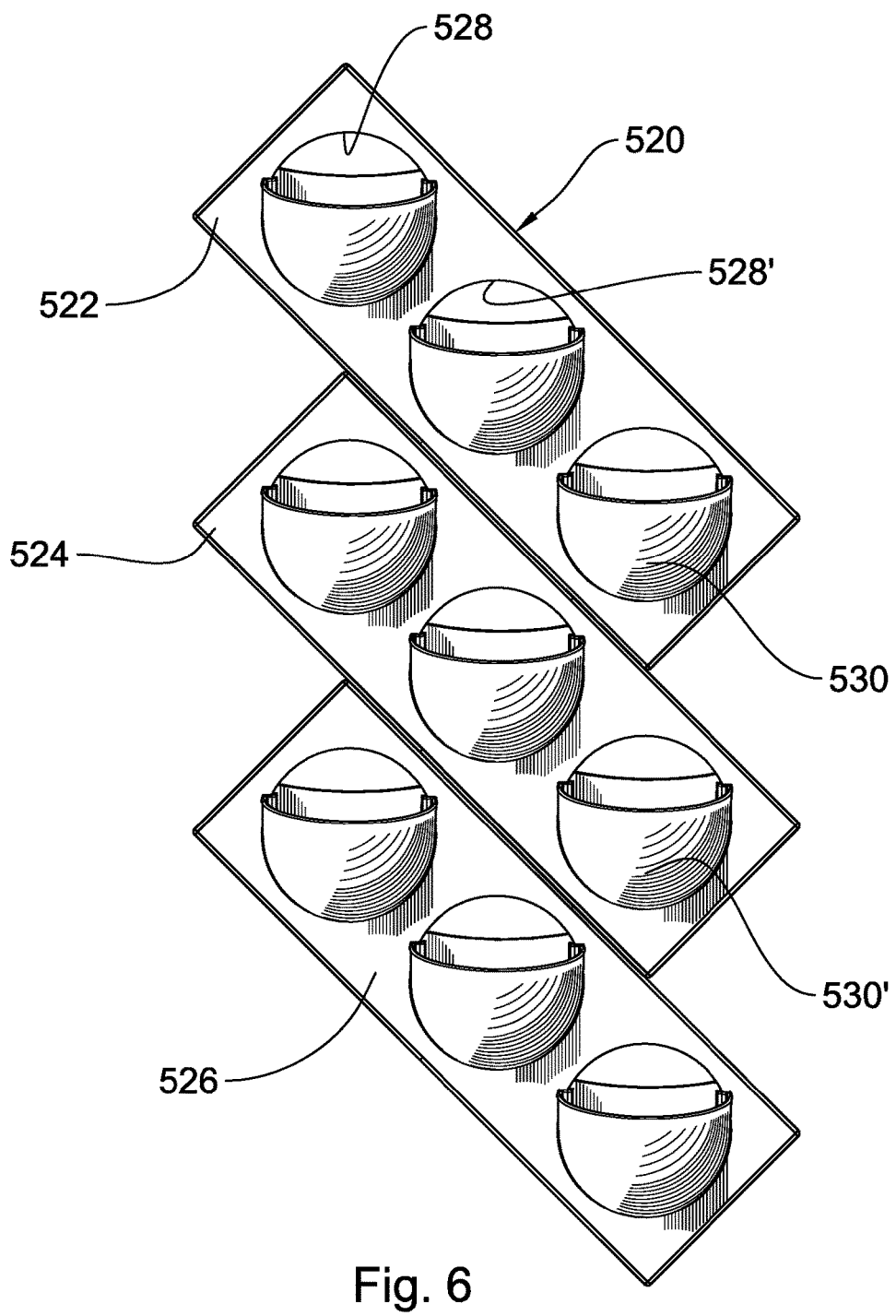
FIG. 6 is a front elevational view of a sixth embodiment of the invention, showing an array of three obliquely vertically offset rectangular panels each extending in a downwardly rightwardly oriented fashion and carrying a triplet of flower pot support members.

In the embodiment of FIG. 6, an interconnected three panels array 520 is formed, defining three juxtaposed panels 522, 524 and 526, all panels 522-526 extending obliquely in downwardly rightwardly offset fashion. Each panel 522-526 includes a number (e.g. 3) of circular windows 528, 528', . . . each for releasable interlocking engagement by a flower pot support member 530, 530', . . . sized and shaped accordingly.

As illustrated in FIGS. 7 to 10 of the drawings, each flower pot member, such as member 330 lodged inside panel window 328 of the fourth embodiment of panel array of FIGS. 4 and 4A, includes a front semi-hemispherical section 332 and a rear flat wall 334. Two opposite rail members or flanged grooves 336, 338 are made on the external face of semi-hemispherical section 332 adjacent the opposite lateral edges of flat wall 334. A top mouth 340 is formed at the top edges of semi-hemispherical section 332, flat wall 334 and grooves 336 and 338, respectively through which mouth 340 access to the flower pot support enclosure 342 is possible for periodic ingress/egress of soil, water, fertilizer and plants. A flat releasable water dripping rack 344 may be added to the arcuate transverse bottom flooring 332A of flower pot support pocket or enclosure 342. The top edge portion 322A of panel 322 may be releasably mounted to a balcony guardrail G by a male hook member 346. In one embodiment, hook member 346 is telescopically extendable as suggested in FIG. 7.

Figure 11:
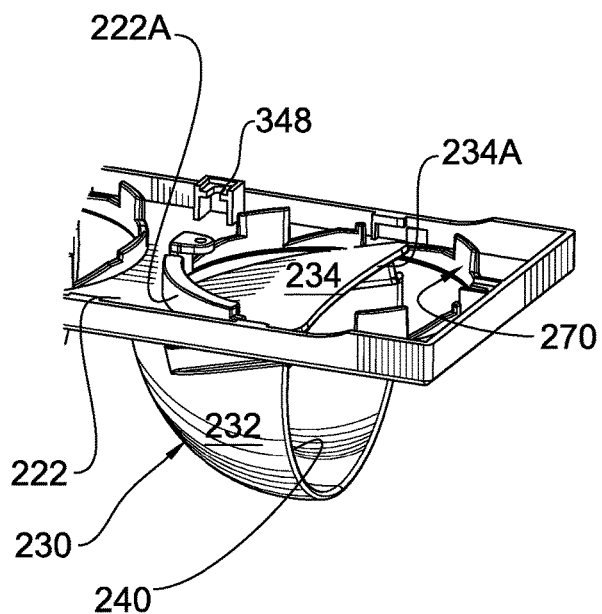
FIGS. 11 and 12 are enlarged rear perspective views of an end portion of the array panel of FIG. 3, sequentially showing how one flower pot support member is first slidingly engaged and then tilted rearwardly in its nesting condition into the panel corresponding window.
Figure 12:
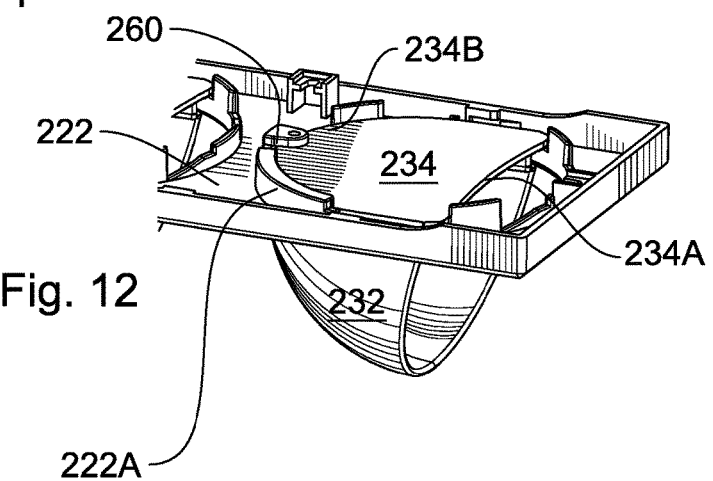
Figure 11A:
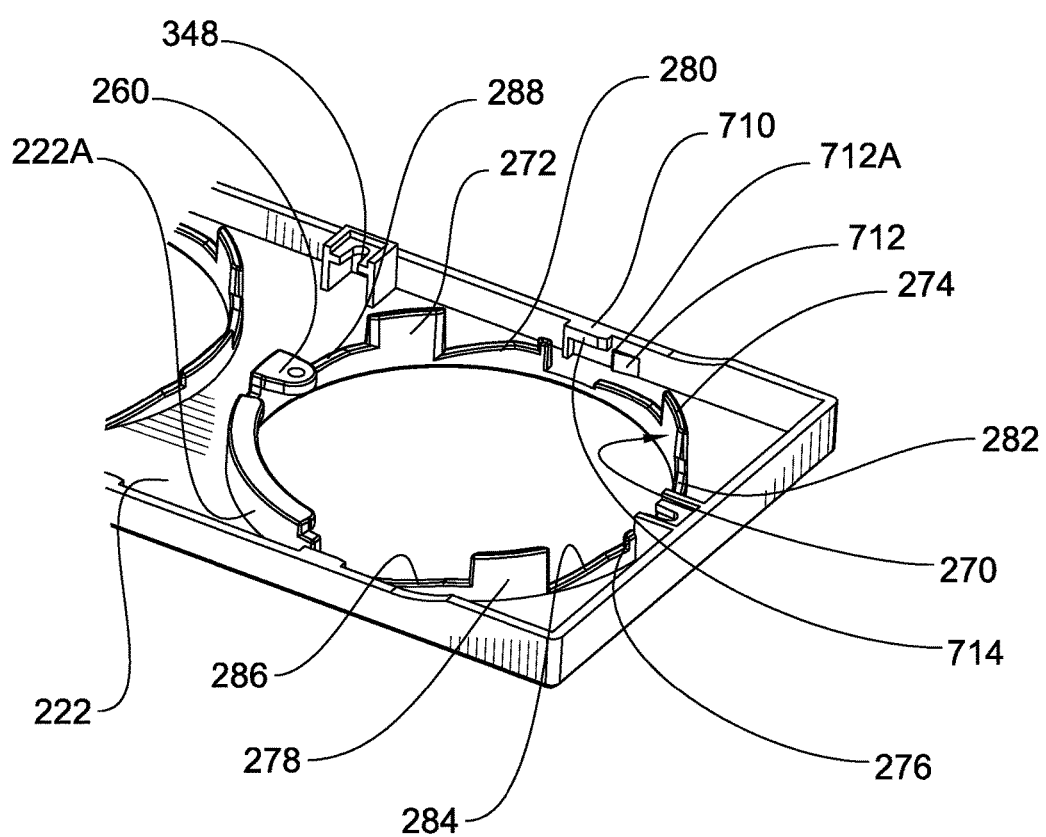
FIG. 11A is a view similar to FIG. 11 but with the flower pot support member removed for clarity of the view.
Figure 13:
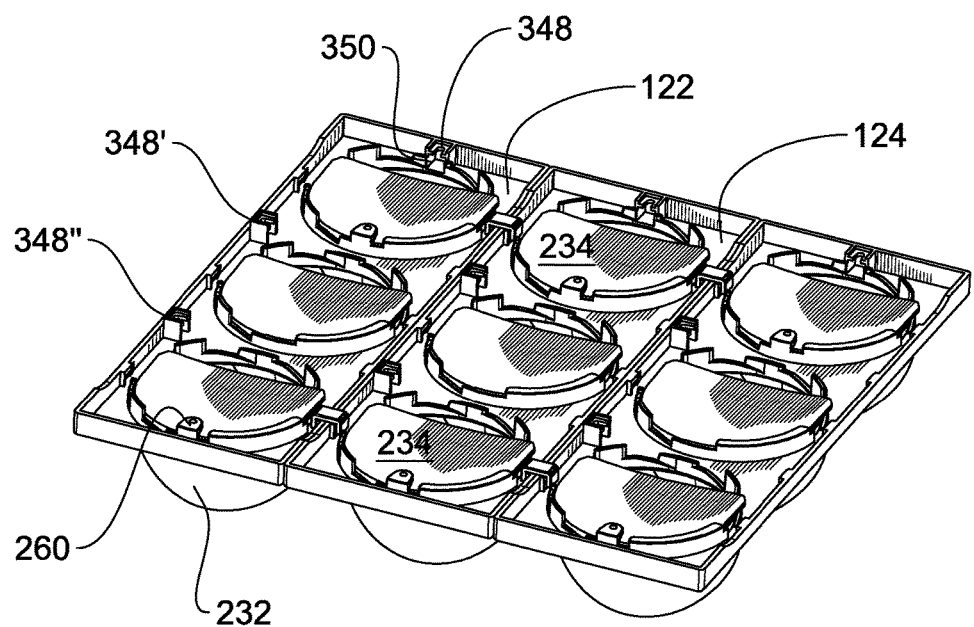
FIG. 13 is a rear enlarged perspective view of the second embodiment of flower pots support array of FIG. 2.

In one embodiment, shown in FIGS. 11A and 13, each rectangular panel from the first to sixth embodiment such as second embodiment panel 122 from FIGS. 2 and 13 or fourth embodiment panel 322 from FIGS. 3 and 9-12, is edgewisely fitted on its rear face with one or more female generally U-shape hook engagement brackets 348, with a selected single one bracket 348 for a given panels array (e.g.

Figure 7:
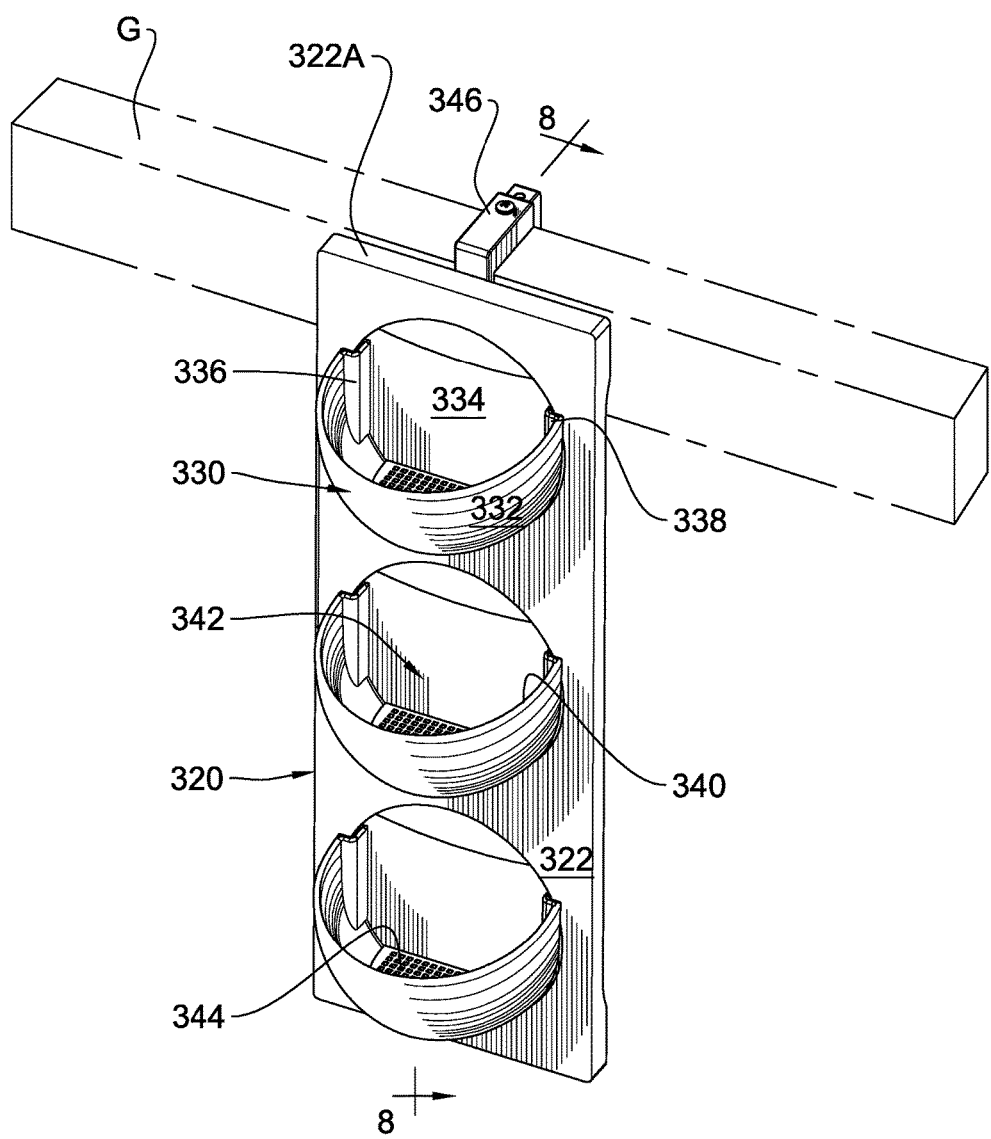
FIG. 7 is an enlarged perspective view of the fourth embodiment of flower pots support array of FIG. 4, and further showing said array fixedly connected at its top portion by a bracket transversely anchored to a balcony horizontal guardrail as illustrated in phantom lines.
Figure 8:
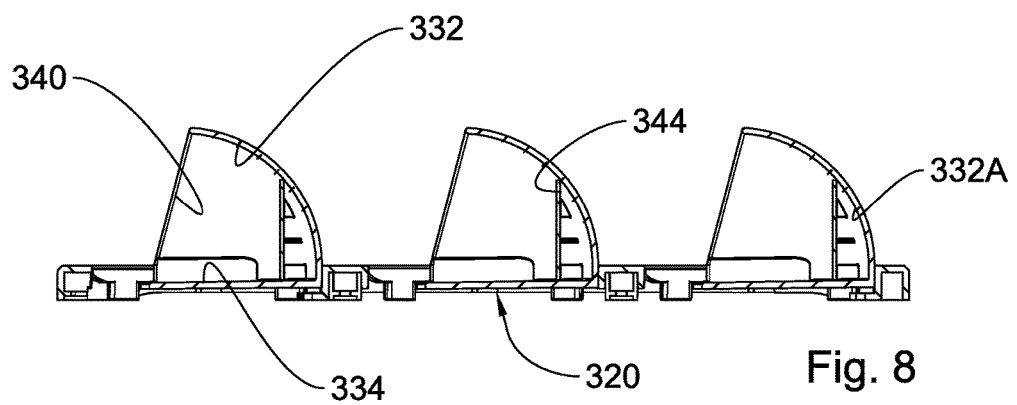
FIG. 8 is a sectional view taken along line 8-8 of FIG. 7.
Figure 9:
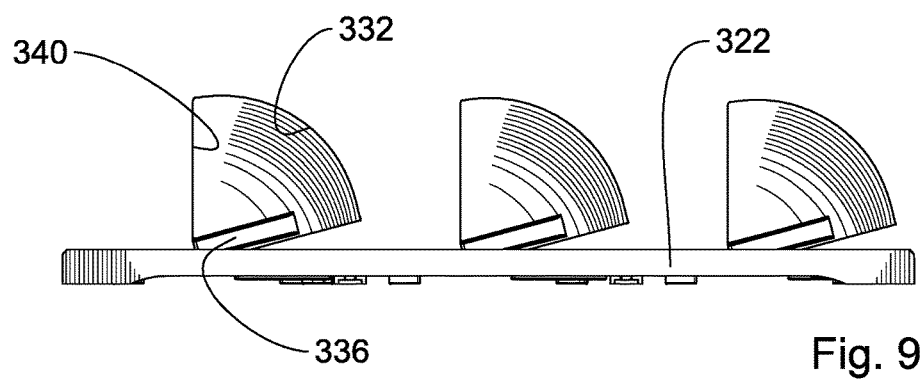
FIGS. 9 and 10 are lateral side edge views of the array embodiment of FIG. 7, sequentially suggesting how each of the three flower pot support members are tilted and slidingly releasably engaged in their operative nesting condition inside the corresponding windows of the array single panel.
Figure 10:
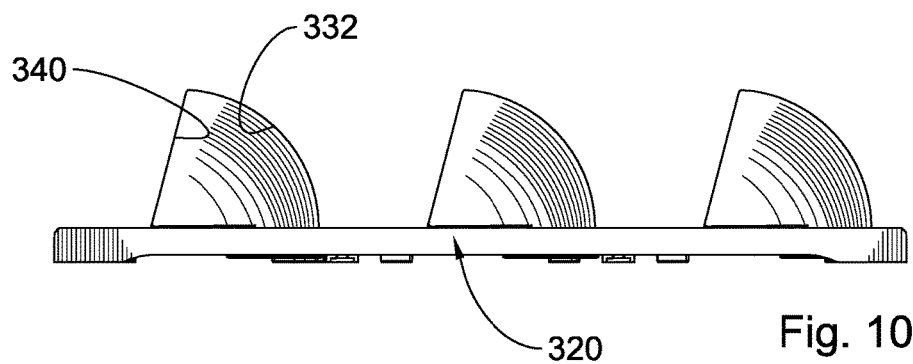

320 of FIG. 7) for releasable supporting engagement by male hook member 346 (of FIG. 7): for example, one female bracket 348 may be mounted to the short side of rectangular panel 322 and two spaced brackets 348', 348" to the long side of panel 322 so as to provide selective versatility in panel anchoring point to guard rail G and thus enable selective orientation spacedly above ground of panels array. Brackets 348 may be e.g. cross-sectionally U-shape, as shown, with a bracket flange 350 sized and shaped to retainingly engage the mating lip of telescopic hook member 346.

As suggested in FIGS. 11, 11A and 12, the width of top leading edge 234A of flower pot support rear wall 234 is sized to be slightly less than the largest central diameter of panel window 228, so as to enable through passage of rear wall 234 through window 228 and rearwardly partly beyond the latter's plane.

As best illustrated in FIGS. 4A, 11, 11A and 12, window 228 of panel 222 is lined with an irregular rearwardly transversely protruding flange assembly 270. Flange assembly 270 includes four rearwardly protruding tangential peripherally successively spaced quadrangular fingers 272, 274, 276, and 278, and a single arcuate rearwardly protruding flange member seat 222A, in generally equidistant successive pair fashion. Each successive pair of fingers (e.g. 272 and 274, 274 and 276, 276 and 278, and arcuate flange member seat 222A and finger 278) are spaced by a ramp 280, 282, 284, 286 and 288 respectively of progressively decreasing rearwardly protruding depth, for facilitating edgewise sliding engagement by wall 234 of flower pot support member 230.

The contour of panel window 228 is sized and shaped to accommodate sliding engagement of flower pot support wall 234 (as suggested by FIG. 11) inside panel window 228 while retaining therein flower pot support member 230 in nesting condition within window 228 by its own weight on arcuate flange seat 222A after full ingress of flower pot support wall 234 rearwardly of the plane of panel window 228. More particularly, after said sliding action of support member 230 inside window 228 and upon further rearward tilting action of support member 230 (see FIGS. 11 and 12), the peripheral bottom portion 234B of wall 234 opposite top leading edge 234A thereof comes to engage rearwardly protruding arcuate flange 222A lining one lateral bottom side edge portion of window 228 of panel 222, so that a support member 230 comes to nest inside window 228 and so that arcuate flange 222A forms a seat for releasable abutting engagement by flower pot support member 230.

In one embodiment, as an alternate mode of attachment of panel 222 to an external wall surface (not shown) different from the balcony guardrail connector 346, a supplemental rearwardly transversely protruding bracket 260 (FIG. 12) integral to the rear face of panel 222 adjacent flange 222A is provided to fixedly secure with screws (not shown) the panel 222 against said external wall surface.

Figure 14:
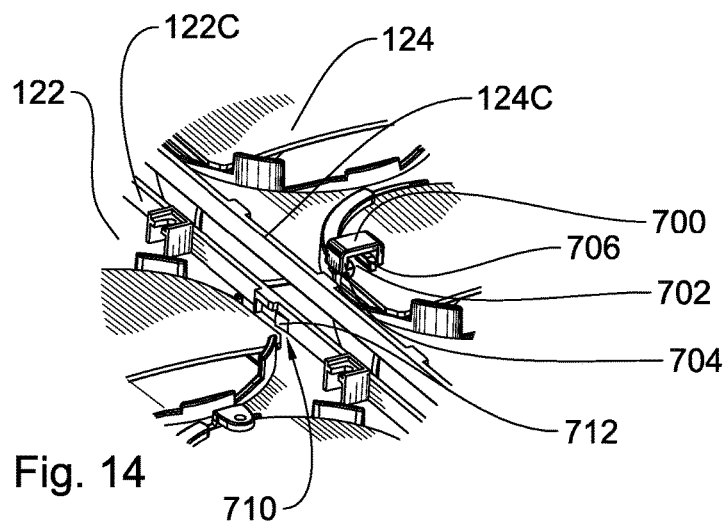
FIGS. 14, 15 and 16 are enlarged perspective views of a juxtaposed edge portion of any two said rigid panels from any one of said embodiments of flower pots supports array, sequentially suggesting how the C-shape connector engages the two edgewise flanges from the two adjacent panels, and also suggesting how the C-shape connector slides along the flanges releasably to interlock with the integral lock keys of said edgewise flanges.
Figure 15:
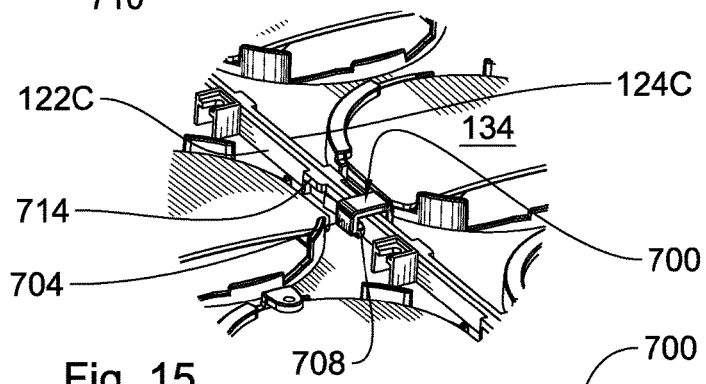
Figure 16:
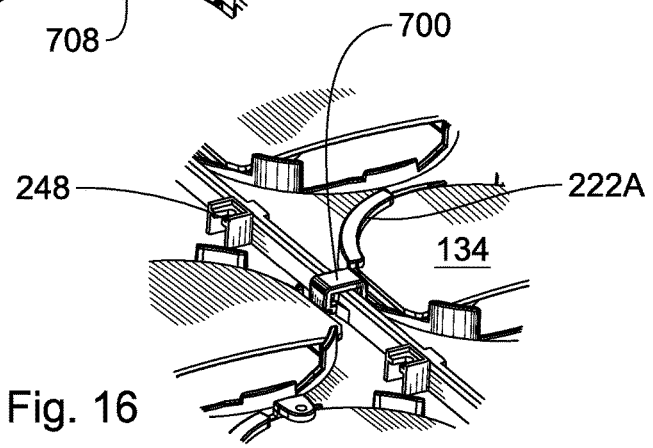

FIGS. 14-16 show how each pair of adjacent panels, e.g. panels 122 and 124, are edgewisely interconnected. Each panel 122, 124, includes a peripheral flange 122C, 124C. Cross-sectionally U-shape connectors 700 are provided, each defining a mouth 702 with opposite resilient lips 704, 706. Each lip 704, 706 forms on its interior face a retaining barb 708. As suggested in FIG. 14, connector mouth 702 is sized and shaped to engage transversely of the juxtaposed flanges 122C, 124C, by temporarily spreading apart resilient lips 704, 706, to transversely overlap both flanges 122C, 124C, so as to retain the latter together, both under resilient bias and under frictional wedge action of barbs 708 against panel flanges 122C, 124C. Connectors 700 are made from a resilient rigid material.

To prevent accidental release of connectors 700 from flanges 122C, 124C, there is provided on each interior face of flanges 122C, 124C, a few lock key means 710. As best illustrated in FIG. 11A, lock key means 710 includes a tapered wedge block 712 and a cross-sectionally L-shape angled pocket 714 spaced at a suitable lengthwise distance gap from wedge block 712 along flange 122C or 124C, for receiving and retaining connector lips 704, 706 in releasable snap-lock fashion.

In operation, and as sequentially suggested in FIGS. 14 to 16 of the drawings, as connectors 700 slide lengthwisely along juxtaposed panel flanges 122C, 124C, resilient lips 704, 706 are slightly spread apart at the connector mouth 702 by engagement over wedge block 712, thus widening the width of connector mouth 702. Upon further sliding motion of connector 700 along flanges 122C, 124C and associated release of connector 700 from the larger trailing end 712A (facing L-pocket 714) of wedge block 712, the lips 704, 706 again move resiliently toward one another to abut once again against the main body of flanges 122C, 124C and slidingly reach into pockets 714 and become trapped therein (as suggested in FIG. 16) because of the larger trailing end 712A of wedge blocks 712 facing the connector lips 704, 706, and blocking return sliding motion thereof, thus locking in place the two panels 122, 124 edgewisely against one another.

What is claimed is:

1. A flower pot support assembly comprising at least one rigid panel, each said panel defining at least one window, and at least one flower pot support member each sized and shaped for through retaining engagement inside a corresponding one said window, each said support member defining a first wall forming a top arcuate edge, two lateral side wall edges and an arcuate flooring bottom edge portion, a second wall having two opposite side edge portions, a bottom end portion and a top free edge portion, and a pair of cross-sectionally arcuate radially inwardly projecting rail members integrally interconnecting said second wall side edge portions with said first wall side edges, wherein an open enclosure pocket is formed therebetween defining a top flower pot engaging mouth, each said rail member defining a trough opening in a direction opposite said mouth transversely thereof and releasably engaged by complementary two opposite edge members of said window, and seat means integral to said panel adjacent an arcuate lower portion of each said window and abuttingly cooperating with a corresponding said support member second wall bottom edge portion and with said rail members under flower pot support sliding and tilting engagement, all in such a way as to releasable lock said support member in a nesting condition inside said window with said mouth facing upwardly.

2. A flower pot support assembly as in claim 1, wherein said second wall is generally planar and slightly arcuate, forming a convex face oriented toward said open enclosure pocket.

3. A flower pot support assembly as in claim 1, wherein each said panel is quadrangular and defines two opposite side edge portions and said first wall is semi-hemispheric, and further including two additional juxtaposed said panels and complementary first and second key means releasably interlocking said panels side edge portions in successive pairs of said panels wherein a planar triple panels flower portion support assembly is obtained.

4. A flower pot support assembly as in claim 3, wherein said first key means consists of a number of releasable cross-sectionally U-shaped connectors each having two opposite resilient side legs with each said leg forming on an interior face thereof a retaining barb, each said connector sized and shaped for overlapping transverse engagement against a successive pair of juxtaposed said panels side edge portions, and said second key means consists of wedge means integral to said panels side edge portions and sized and shaped for releasable interlock with selected said U-shape connectors.

5. A flower pot support assembly as in claim 1, further including a water draining grate, mounted at the bottom of said open enclosure pocket above said first wall flooring portion.

6. A flower pot support assembly as in claim 1, further including mounting means, integral to one of said at least one panel, for releasable anchoring of said at least one panel to a structural brace above ground whereby said flower pot support assembly hangs freely spacedly above ground.

7. A flower pot support assembly as in claim 1, further including sloping ramp means integral to each said panel at a peripheral edge of each said window and cooperating with said seat means and said support member two lateral side wall edges during sliding and tilting engagement of the support member retainingly through said window.

8. A method of releasable engagement of a flower pot support inside the window of an overhanging support panel, said panel of the type having at least one window, said flower pot support sized and shaped for through retaining engagement inside a corresponding one said window, each said support defining a first wall forming a top arcuate edge, two lateral side wall edges and an arcuate flooring bottom edge portion, a second wall having two opposite side edge portions, a bottom end portion and a top free edge portion, and a pair of cross-sectionally arcuate radially inwardly projecting rail members integrally interconnecting said second wall side edge portions with said first wall side edges, wherein an open enclosure pocket is formed therebetween defining a top flower pot engaging mouth, each said rail member defining a trough opening in a direction opposite said mouth transversely thereof releasably engaged by complementary two opposite edge members of said window, sliding ramp means and seat means both integral to said window;

wherein said method comprises the following steps:
 a. engaging said support through said window;
 b. edgewisely slidingly engaging said rail members along said ramp means;
 c. hingedly tilting said support from a first orientation transverse to said window to a second orientation generally co-planar with said window;
  and, upon said support reaching said second orientation,
 d. abutting said support against said seat means in cooperating fashion with a corresponding said support second wall bottom edge portion and with said rail members under flower pot support sliding and tilting engagement, all in such a way as to releasable lock said support inside said window with said mouth facing upwardly.

* * * * *